United States Patent [19]

Whiteside

[11] Patent Number: 5,490,659
[45] Date of Patent: Feb. 13, 1996

[54] REINFORCED DIAPHRAGM FOR FLUSH VALVES

[75] Inventor: John F. Whiteside, Franklin Park, Ill.

[73] Assignee: Sloan Valve Company, Franklin Park, Ill.

[21] Appl. No.: 358,270

[22] Filed: Dec. 19, 1994

[51] Int. Cl.⁶ .................................................. F16K 31/145
[52] U.S. Cl. ...................... 251/40; 251/331; 251/368; 92/103 F
[58] Field of Search ..................... 251/40, 45, 46, 251/331, 61.1, 368; 137/509, 510; 92/103 F, 103 R, 96

[56] References Cited

U.S. PATENT DOCUMENTS 2,747,608   5/1956  Grove ..................................... 251/46 X
4,327,891   5/1982  Allen et al. .............................. 251/40 X
4,883,254  11/1989  Whiteside ............................... 251/40 X

*Primary Examiner*—Martin P. Schwadron
*Assistant Examiner*—Kevin L. Lee
*Attorney, Agent, or Firm*—Dorn, McEachran, Jambor & Keating

[57] ABSTRACT

A diaphragm for flush valves has a plurality of concentric reinforcing rings spaced closer together at the smaller diameters of the diaphragm than at the larger diameters. The reinforcing rings have a geometrically progressive spacing from the inside to the outside of the diaphragm so as to provide maximum hoop stress reduction with a minimum amount of material.

12 Claims, 1 Drawing Sheet

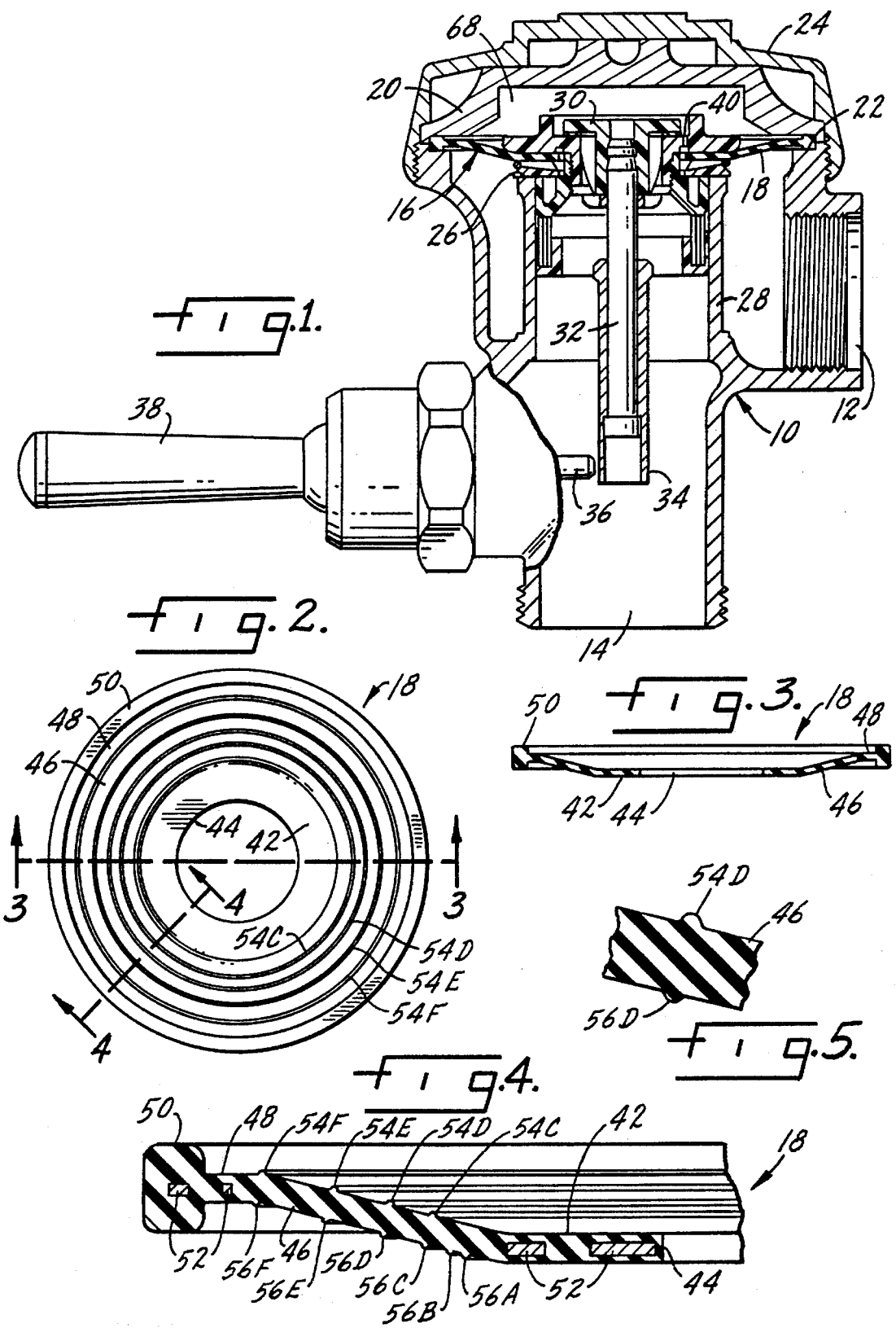

REINFORCED DIAPHRAGM FOR FLUSH VALVES

SUMMARY OF THE INVENTION

This invention relates to flush valves of the type used with toilet devices such as urinals and water closets and particularly to a diaphragm-type flush valve. A flush valve of this type is shown in U.S. Pat. No. 5,332,192, the disclosure of which is incorporated herein by reference. More specifically, the invention relates to an improved diaphragm having reinforcing rings geometrically progressively spaced to provide maximum reduction of hoop stress.

Hoop stress in a vessel of revolution is the stress along a parallel circle about the axis of rotation. The diaphragm of a flush valve falls in this category of devices which are subject to hoop stress. The diaphragm is actually a torus-shaped device. It can be shown from the equations of statics that in most cases hoop stress is the largest of the three main stresses. Furthermore, in the torus-shaped diaphragm the maximum hoop stress is toward the center of the diaphragm. The present invention has reinforcing rings that are spaced more closely together near the center of the diaphragm to provide more cross-sectional area to carry the load, and thus reduce the stress in that region. The diaphragm is made of ethylene propylene dien monomer (EPDM) which is peroxide-cured. The reinforcing rings allow minimum use of this material while still performing the function of a diaphragm.

BRIEF DESCRIPTION OF THE DRAWINGS

FIG. 1 is a side view, in part section, illustrating a flush valve of the type described.

FIG. 2 is top plan view of the diaphragm of the present invention.

FIG. 3 is a section taken along line 3—3 of FIG. 2.

FIG. 4 is a section, on an enlarged scale, taken along line 4—4 of FIG. 2.

FIG. 5 is an enlarged detail view of one of the reinforcing rings.

DETAILED DESCRIPTION OF THE INVENTION

In FIG. 1 a flush valve of the type manufactured by the assignee of the present application, Sloan Valve Company, of Franklin Park, Ill., and sold under the trademark ROYAL, is shown to include a body 10 having an inlet connection 12 and an outlet connection 14. A diaphragm assembly, indicated generally at 16, includes a diaphragm 18 peripherally held to the body 10 by an inner cover 20. The diaphragm is seated upon a shoulder 22 at the upper end of body 10 and is clamped in this position by the inner cover 20. An outer cover 24 is screw-threaded onto the body to hold the inner cover in position.

The diaphragm assembly 16 is closed upon a valve seat 26 formed at the upper end of a barrel 28. The barrel 28 forms the conduit connecting the valve seat with outlet 14. The diaphragm assembly 16 includes a relief valve 30 having a downwardly-extending stem 32 carrying a movable sleeve 34. Sleeve 34 is positioned for contact by a plunger 36 when operated by a handle 38 as is conventional in the operation of flush valves of the type disclosed. Further details of the diaphragm assembly are shown in U.S. Pat. No. 5,332,192.

As is known in the art, flush valves of the type disclosed herein require pressure in chamber 68 in order to maintain the diaphragm closed upon its seat 26. Water at inlet 12 will flow through a bypass 40 in the diaphragm assembly to reach chamber 68 and will maintain the diaphragm in the closed position shown.

In operation, pivotal movement of handle 38 causes plunger 36 to contact the sleeve 34 of the relief valve. The relief valve tilts, venting the pressure from chamber 68 down through the interior of the diaphragm. This permits the diaphragm to raise up from its seat, pulling the diaphragm assembly upward, connecting the inlet 12 to the outlet 14. As soon as the valve has been operated, the bypass orifice 40 immediately begins to recharge chamber 68. When the chamber has been sufficiently pressurized, the diaphragm assembly will move toward closing upon its seat 26. As it so moves it will throttle and then ultimately close off the flow of water between the inlet and the outlet.

Looking now at FIGS. 2–5, the diaphragm 18 of the present invention is shown in detail. The diaphragm is a somewhat dish-shaped member having a base portion 42 with a central bore 44 therethrough, an angled web portion 46, and a peripheral flat band 48 having a flange 50. Internal reinforcing rings 52 may be molded into the base, band and flange as shown. These rings are preferably metallic while the remainder of the diaphragm is made of ethylene propylene dien monomer (EPDM) which is peroxide-cured. Peroxide-cured EPDM will withstand chloramines which are present in the water. At the present time the sulfur-cured form of this material is less desirable but if improvements were made in chloramine resistance sulfur-cured EPDM could be used. The EPDM preferably has an "A" Shore durometer of 70±5. This makes the material harder than natural rubber but softer than plastic.

The web portion 46 has a series of concentric reinforcing rings or ribs 54C–F on its upper surface and a similar series of reinforcing rings 56A–F on its lower surface. The reinforcing rings are integrally molded into the web to provide areas of increased thickness. They are spaced more closely together near the base portion 42 than at the band 48. Thus, for example, rings 56A, B and C are closer together than rings 56D, E and F. Preferably the spacing is a geometric progression. By way of example and not by limitation, a diaphragm having a 3.25" outside diameter (i.e., the outside diameter of the flange 50), a base portion outer diameter of about 1.70" and a thickness of about 0.06" has rings 54 located according to the equation:

$$D = 0.0305 N^2 - 0.0295 N + 1.817$$

where D is the diameter of the reinforcing ring in inches and N is the number of the particular ring from 1 to 6. Ideally there are about six rings on both the top and bottom of the web but due to interference with portions of the diaphragm assembly, the two innermost rings on the top surface had to be deleted. Obviously, other equations which are geometrically progressive from the center out could have been used but they would approximate the above polynomial. With the rings spaced according to this equation the rings are concentrated in the region of greatest loading on the diaphragm, thereby reducing the hoop stress and enabling the diaphragm to perform its function with a minimum amount of material.

One other variable is the cross-sectional area of the rings 54 and 56. Larger rings provide more area and thus lower hoop stress. But that would also increase the total amount of rubber used. The overall goal of the present invention is to perform the function of a diaphragm with a minimum amount of material. Accordingly, for the size diaphragm outlined above it has been found appropriate to use a ring that has a semi-circular cross-section (FIG. 5), protruding above the surface of the web with a radius of about 0.008". The juncture of the ring with the web surface has a radius of about 0.004". Again, other dimensions could be used and the invention is not to be limited to the particular dimensions cited. Also, the reinforcing rings could have a cross-section other than the semi-circle shown.

While a preferred form of the invention has been shown and described, it will be realized that alterations and modifications may be made thereto without departing from the scope of the following claims.

I claim:

1. A diaphragm-type of flush valve for use with toilet devices such as urinals and water closets including a body having an inlet and an outlet, a valve seat between said inlet and outlet and a valve member movable to a closing position on said valve seat to stop flow between said inlet and outlet, said valve member including a diaphragm peripherally attached to said body, the diaphragm having a plurality of reinforcing rings formed thereon, the reinforcing rings being spaced more closely together at the interior of the diaphragm that at its periphery with such spacing being geometrically progressive from the interior of the diaphragm to its periphery.

2. The flush valve of claim 1 wherein the diaphragm is made of peroxide-cured EPDM.

3. The flush valve of claim 1 wherein the diaphragm includes a central base portion, an angled web portion, and a peripheral band portion, the reinforcing rings being formed on the web portion.

4. The flush valve of claim 1 wherein the reinforcing rings are integrally formed in the diaphragm.

5. In a flush valve of the type including a body having an inlet and an outlet, a valve seat between said inlet and outlet and a valve member movable to a closing position on said valve seat to stop flow between said inlet and outlet, said valve member including a diaphragm peripherally attached to said body, the improvement comprising a diaphragm having a plurality of reinforcing rings formed thereon, the reinforcing rings being spaced more closely together at the interior of the diaphragm than at its periphery with such spacing being geometrically progressive from the interior of the diaphragm to its periphery.

6. The flush valve of claim 5 wherein the diaphragm is made of peroxide-cured EPDM.

7. The flush valve of claim 5 wherein the diaphragm includes a central base portion, an angled web portion, and a peripheral band portion, the reinforcing rings being formed on the web portion.

8. The flush valve of claim 5 wherein the reinforcing rings are integrally formed in the diaphragm.

9. A diaphragm-type of flush valve for use with toilet devices such as urinals and water closets including a body having an inlet and an outlet, a valve seat between said inlet and outlet and a valve member movable to a closing position on said valve seat to stop flow between said inlet and outlet, said valve member including a diaphragm peripherally attached to said body, said diaphragm being made of peroxide-cured EPDM, said diaphragm having a plurality of reinforcing rings formed thereon, the reinforcing rings being spaced more closely together at the interior of the diaphragm than at its periphery.

10. In a flush valve of the type including a body having an inlet and an outlet, a valve seat between said inlet and outlet and a valve member movable to a closing position on said valve seat to stop flow between said inlet and outlet, said valve member including a diaphragm peripherally attached to said body, the improvement comprising a diaphragm made of peroxide-cured EPDM, said diaphragm having a plurality of reinforcing rings formed thereon, the reinforcing rings being spaced more closely together at the interior of the diaphragm than at its periphery.

11. A diaphragm for use in a flush valve of the type having a body with an inlet and an outlet, a valve seat between the inlet and outlet, and a valve member movable to a closing position on the valve seat to stop flow between said inlet and outlet, said diaphragm being a part of said valve member and having a plurality of reinforcing rings formed thereon, the reinforcing rings being spaced more closely together at the interior of the diaphragm than at its periphery, the reinforcing ring spacing being geometrically progressive from the interior of the diaphragm to its periphery.

12. A diaphragm for use in a flush valve of the type having a body with an inlet and an outlet, a valve seat between the inlet and outlet, and a valve member movable to a closing position on the valve seat to stop flow between said inlet and outlet, said diaphragm being a part of said valve member and having a plurality of reinforcing rings formed thereon, the reinforcing rings being spaced more closely together at the interior of the diaphragm than at its periphery, the diaphragm being made of peroxide-cured EPDM.

* * * * *